United States Patent
Yoshimura et al.

(10) Patent No.: US 6,371,562 B1
(45) Date of Patent: Apr. 16, 2002

(54) REINFORCED ARRANGEMENT IN A VEHICLE SEAT AND METHOD FOR FORMING THE SAME

(75) Inventors: Masakazu Yoshimura; Makoto Shimada, both of Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/570,045

(22) Filed: May 12, 2000

(51) Int. Cl.⁷ .................................................. A47C 7/18
(52) U.S. Cl. ............................ 297/452.61; 297/452.25; 297/452.26; 156/77; 156/245; 156/293
(58) Field of Search ...................... 297/452.26, 452.61, 297/452.22, 452.48, 452.25; 156/77, 245, 293

(56) References Cited

U.S. PATENT DOCUMENTS

| | | | | |
|---|---|---|---|---|
| 2,552,039 A | * | 5/1951 | Flogaus | ................. 297/452.26 |
| 4,534,595 A | | 8/1985 | Abe et al. | |
| 4,824,174 A | * | 4/1989 | Dunn, Sr. | ............... 297/452.61 |
| 5,544,942 A | * | 8/1996 | Vu Khac et al. | ........ 297/452.61 |

* cited by examiner

Primary Examiner—Anthony D. Barfield
(74) Attorney, Agent, or Firm—Browdy and Neimark

(57) ABSTRACT

Reinforcement is given in a vehicle seat with such an arrangement that a plurality of recessions and at least one decorative groove are scatteringly formed in each of two spaced-apart protuberant side support portions of the vehicle seat. A foaming is effected to create a foam padding of a predetermined shape of the seat having two spaced-apart protuberant side support portions, such as to define a plurality of first recessions and at least one first decorative groove in each of those two side support portions, after which, a trim cover assembly is pressingly bonded to the thus-formed foaming pad, thereby forcibly inserting and bonding plural points of the trim cover assembly in those first recessions and decorative groove of padding. A resulting seat is therefore provided not only with a highly enlarged area of cured and hardened adhesive layer, but also with an intensified stretched state of trim cover assembly, whereby an increased reinforcement is given to both two side support portions of the seat.

10 Claims, 4 Drawing Sheets

REINFORCED ARRANGEMENT IN A VEHICLE SEAT AND METHOD FOR FORMING THE SAME

BACKGROUND OF INVENTION

1. Field of the Invention

The present invention relates to a vehicle seat having two protuberant side support portions and a method for forming the same. In particular, the invention is directed to a reinforced arrangement in the vehicle or automotive seat of this kind (including seat cushion or seat back) wherein the outer surfaces thereof are reinforced to improve a side support property for supporting the lateral body portion of an occupant sitting on the seat, and a method for forming such reinforced arrangement.

2. Description of Prior Art

Vehicle and automotive seats are normally comprised of a seat back and seat cushion as a well known state of art. In some seats of this kind, either of the seat back and seat cushion is of the typical configuration having a central lowered support portion on which the buttocks or back of a driver or passenger rests, and a pair of protuberant side support portions (i.e. lateral bolster portions) defined protuberant on the opposite sides of and symmetrically relative to the central support portion. The two side support portions provide a side support effect to support and hold therebetween both thigh sides of the driver or passenger or both lateral sides of his or her from the waist up.

In manufacturing such seat with two side support portions, there has been employed a bonding process for bonding a covering material via adhesive agent to a pre-molded foam padding having a predetermined seat configuration in which a central support portion and two protuberant side support portions are formed as stated above.

In order to improve the foregoing side support effect, it has been a conventional practice to use a high-density foam padding material in forming each of the two side support portions, while on the other hand, using a low-density foam padding material for the central support portion, during the steps of preforming a given whole configuration of foam padding to be covered with a covering material. However, this approach has been found defective in the troublesome necessity of forming two different densities of padding materials and further posing a difficulty in forming them together precisely into one integral seat configuration. Still further defective aspect of it is that a passenger, who sits on this kind of seat, will feel an uneven and objectionable cushiony touch due to the two different densities of padding materials.

In avoiding that problem, nevertheless, to simply form one integral padding with a same density of foam material will result in the two side support portions being poor in the side support effect over a lengthy period of use, with a high likelihood that they will become collapsed and sink into a useless state.

SUMMARY OF THE INVENTION

With the above drawbacks in view, it is therefore a purpose of the present invention to provide a reinforced arrangement of vehicle seat which is simplified for easy production and effectively protects two side support portions of the seat against collapsing or sinking during a lengthy period of use.

In order to achieve such purpose, a reinforced arrangement of vehicle seat in accordance with the present invention is basically comprised of:

a foam padding of a predetermined shape conforming to an outer shape of the seat, which has, formed in the outer surface thereof, a central support portion and a pair of spaced-apart protuberant side support portions;

a plurality of first recessions defined independently of one another in each of those two paced-apart protuberant side support portions;

at least one first decorative groove defined in each of the same two paced-apart protuberant side support portions; and a trim cover assembly adhesively and pressingly attached via an adhesive agent upon the outer surface of foam padding, wherein the trim cover assembly has, defined therein, a pair of spaced-apart side support cover areas, each covering the respective two spaced-apart protuberant side support portions of foam padding, wherein, in each of the foregoing pair of spaced-apart side support cover areas of trim cover assembly, there are defined a plurality of second recessions and at least one second decorative groove, and wherein the adhesive agent is cured and hardened between the trim cover assembly and the outer surface of foam padding, so that a hardened layer of the adhesive agent is created among the plural first and second recessions as well as between such at least one first and second decorative grooves.

Accordingly, the formation of plural recessions and grooves in the foam padding, firstly, enlarges total areas of high-density film layer on the corresponding surfaces of padding per se, secondly enlarges total areas of cured adhesive layers, and thirdly causes a highly stretched state of trim cover assembly. Those three effects in the aggregate make increasingly hardened each of the two side support portions of a resulting seat . Thus, a supportive property and durability of both two side support portions is greatly improved to maintain their respective shapes over a lengthy period of use, so that a driver or passenger can attain a good unchanged supportive touch therebetween.

Preferably, the adhesive agent may be applied a greater amount to the two protuberant side support portions of foam padding than to the central support portion of the same, and the trim cover assembly may include at least one layer capable of partial impregnation with said adhesive agent, which is juxtaposed with the outer surface of foam padding.

It is another purpose of the present invention to provide a method for obtaining the above-described reinforced arrangement of vehicle seat.

For that purpose, there is basically provided the steps of;

forming said foam padding by a foaming process into the predetermined shape, such that the above-stated plurality of first recessions and at least one first decorative groove are defined in each of the two spaced-part protuberant side support portions of foam padding;

thereafter, pressingly attaching said trim cover assembly, via the adhesive agent, upon the outer surface of the thus-formed foam padding, thereby defining the afore-stated pair of spaced-apart side support cover areas at the respective two protuberant side support portions of foam padding, in such a manner that plural local points of trim cover assembly are forcibly inserted and bonded in the plural first recessions, respectively, thereby defining the afore-stated plurality of second recessions in each of the two side support cover areas, while at the same time, at least another local point of the trim cover assembly is forcibly inserted and bonded in the afore-stated at least one first decorative groove, thereby defining the above-mentioned at least one second decorative groove in each of the two side support cover areas; and curing the adhesive agent between the trim cover assembly and the outer surface of foam padding, so that a hardened layer of the adhesive agent is created among the plural first and second recessions as well as between the at least one first and second decorative grooves.

Another advantages and features of the present invention will become apparent from reading of the descriptions hereinafter, with reference to the annexed drawings.

DETAILED DESCRIPTION OF PREFERRED EMBODIMENT OF THE INVENTION

As illustrated in all FIGS. 1 through 8, there are provided a preferred mode of method for forming a reinforced arrangement of vehicle or automotive seat and one exemplary resultant seat produced thereby in accordance with the present invention.

Figure 1:
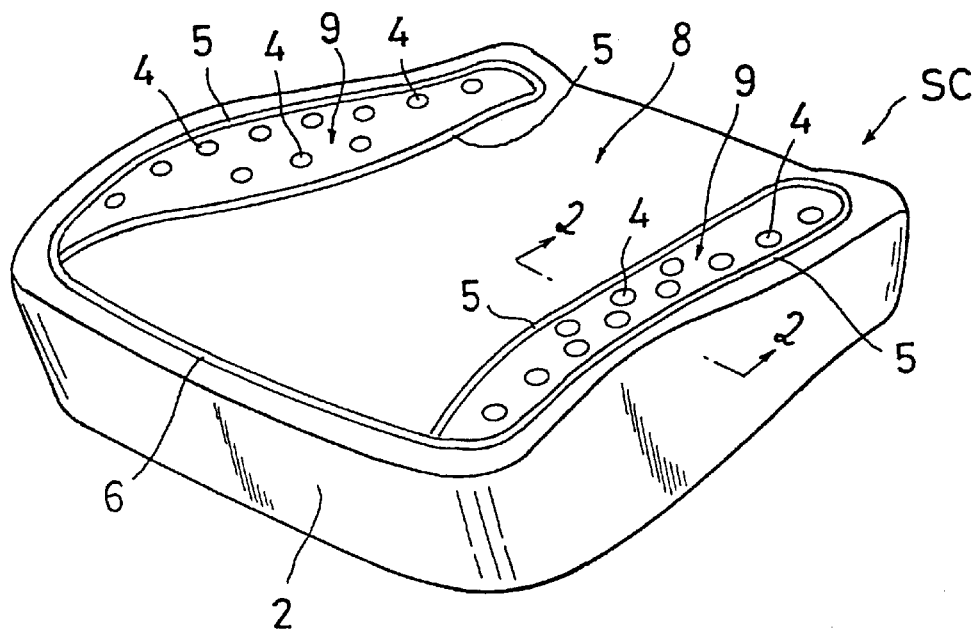
FIG. 1 is a schematic perspective view of a resulting seat or seat cushion in accordance with present invention.
Figure 2:
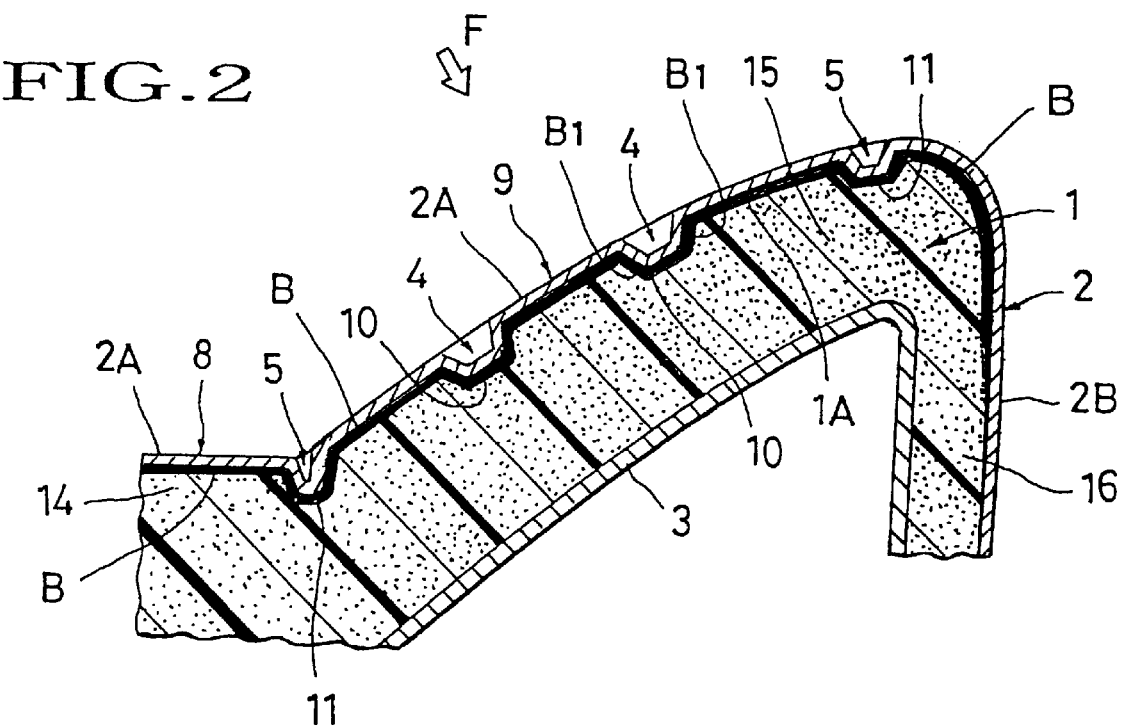
FIG. 2 is a fragmentary sectional view taken along the line 2—2 in the FIG. 1.

FIGS. 1 and 2 show one exemplary mode of seat cushion (SC), a constituent part forming a vehicle seat (not shown), which is formed by a method to be described later. Of course, the seat cushion is not imitative. It is therefore to be understood that the scopes of the present invention also cover a seat back (not shown) of the seat, or a back rest of any kind usable in a vehicle seat, and further cover a seat of the type without back rest or seat back. Be it a seat cushion or seat back, a common construction of seat, to which the present invention is generally directed, is such that a central support portion (at 8) is defined therein for supporting a body portion (buttocks or back) of a driver or passenger, whereas a pair of protuberant side support portions (at 9) are defined symmetrically relative to and taller than that central support portion to thereby support both thigh sides of the driver or passenger (for a seat cushion) or both lateral body portion of his or her from the waist up (for a seat back).

Thus, a foam padding (at 1) is formed by a foaming process into a predetermined shape having those central support portion and two protuberant side support portions.

In the present embodiment, a seat cushion (SC) is to be formed, for instance, with a plurality of scattered circular recessions (4) and a decorative groove (5) defined in each of the two spaced-apart side support portions (9) (9) thereof. As can be seen from FIGS. 3 and 4, the foam padding (1), formed in a predetermined seat cushion configuration, has been provided with a plurality of independently distributed circular recessions (10) and a decorative groove (5) in each of the two protuberant side support padding portions (15) thereof for an improved support purpose to be explained later. Pressingly bonded on the outer surfaces of the thus-formed foam padding (1) is a trim cover assembly (2), and the details of bonding process in this respect will also be explained later. Designation (6) denotes another decorative groove formed in the forward end portion of seat cushion (SC).

Referring now to FIGS. 5(A) to 8, description will be made of a method for forming the above-stated seat, by way of one preferred example, hereinafter, based on the seat cushion (SC) for instance.

Figure 5A:
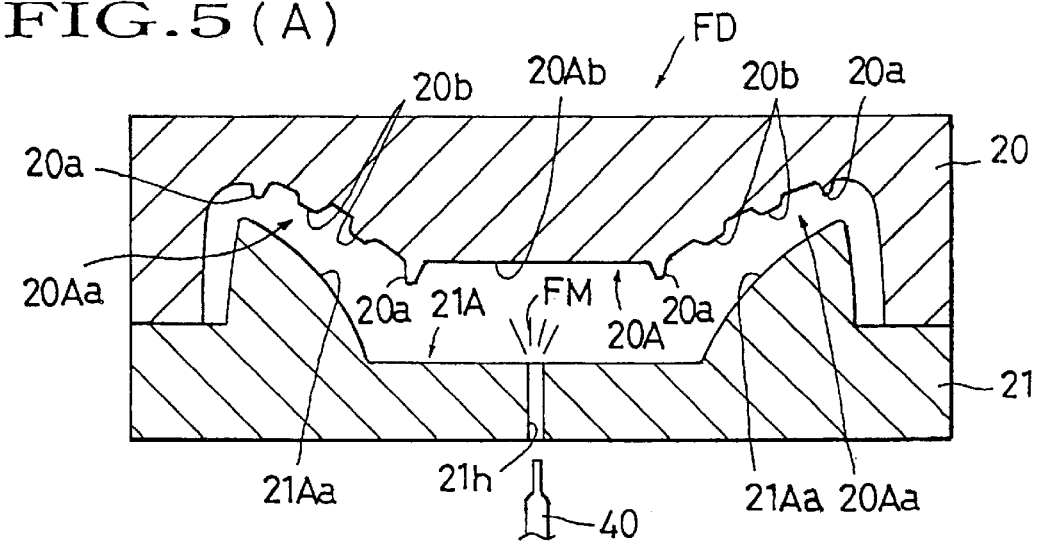
FIG. 5(A) is a cross-sectional view of a foaming die apparatus used in accordance with the present invention.

At first, as shown in FIG. 5(A), a foaming die apparatus (FD) is provided, which comprises an upper die (20) and a lower die (21), both of them being able to be connected together to provide therein an internal hollow of the shape conforming to a predetermined whole outer shape of foam padding (1) which is a base cushion member to be formed for the seat cushion (SC). Namely, the lower die (21) has a working die surface (21A) having an upper uneven contour conforming to the shown bottom shape of foam padding (1) to be obtained, which includes a pair of spaced-apart protuberant side die surface portions (21A*a*) (21A*a*). On the other hand, the upper die (20) has an uneven upper die surfaces (20A) so formed to have a flat central die surface area (20A*b*) and a pair of spaced-apart upwardly recessed side die surface areas (20A*a*) (20A*a*) defined symmetric relative to the central die surface area (20A*b*), all of which conform to the shown upper outer surfaces of the padding (1). In particular, formed in each of those two side die surface areas (20A*a*) are a plurality of generally columnar projections (20*b*) in a scattered fashion or independently of one another, which are designed to form a plurality of circular recessions (10) in each protuberant side support portion (15) of foam padding (1). Designations (20*a*) denote an elongated circular projection formed in each of the same two side die surface areas (20A*a*), which is adapted to form an elongated annular decorative groove (11) in each of the two protuberant side support (1) portions (15) of padding Then, an injection nozzle (40) is inserted through a hole (21*h*) formed in the lower die (21), and a liquid foaming base material (FM) is injected from the nozzle (40) into the hollow defined between the upper and lower dies (20) (21). A foaming is effected to expand and cure the base material (FM) into a predetermined shape of foam padding within the die apparatus (FD).

Figure 3:
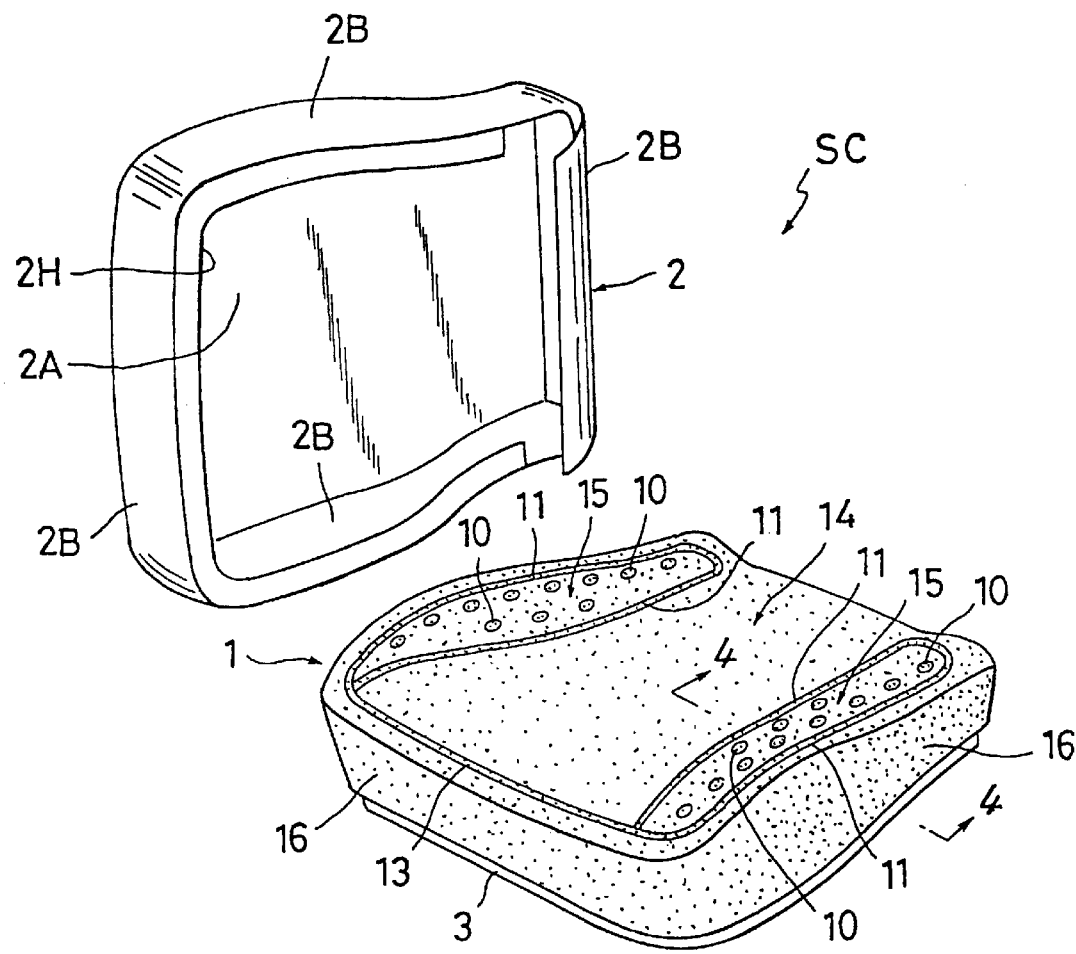
FIG. 3 is a schematic exploded perspective view of the seat or seat cushion shown in the FIG. 1.
Figure 4:
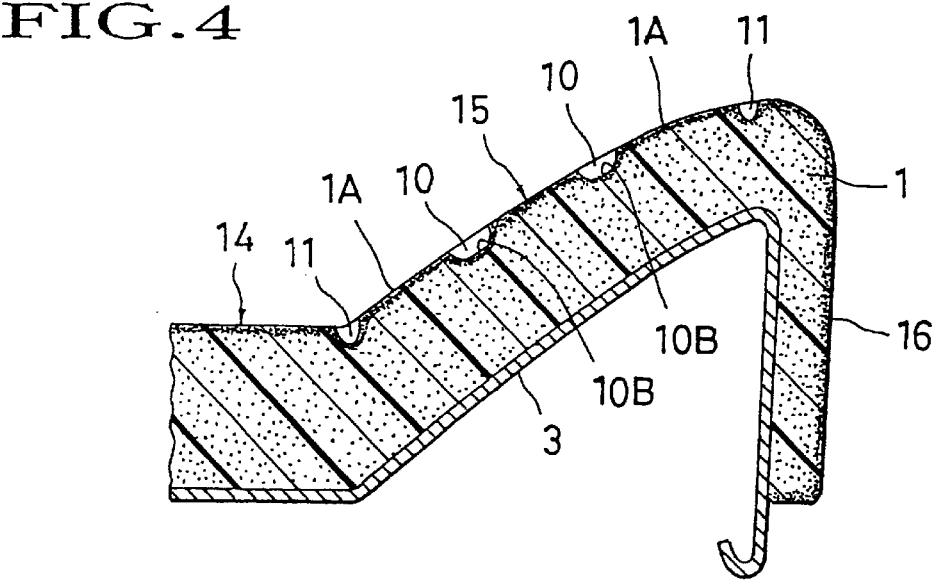
FIG. 4 is a fragmentary sectional view taken along the line 4—4 in the FIG. 3.
Figure 5B:
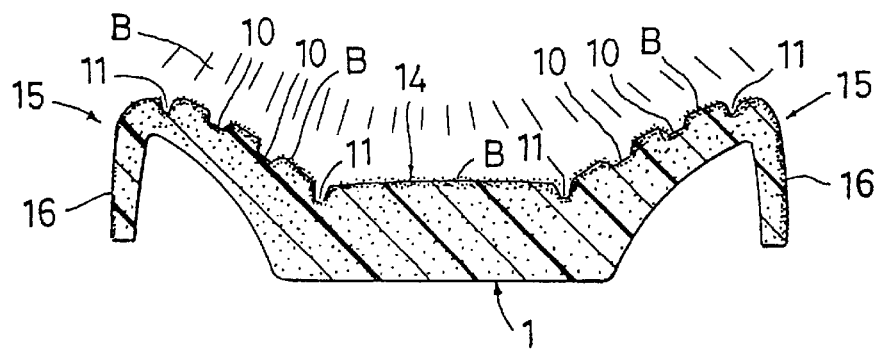
FIG. 5(B) is a cross-sectional view of a resulting foam padding formed by the foaming die apparatus.

FIG. 5(B) shows a resulting foam padding (1), in the cross-section, which has been removed from those two dies (20) (21). As can be seen from both FIGS. 5(B) and 3, the padding (1) is thus formed in a predetermined configuration conforming to a desired form of seat cushion (SC), having a central support portion (14), a pair of spaced-apart protuberant side support portions (15) and a peripheral lateral wall portion (16), wherein the plural circular recessions (10) and elongated annular decorative groove (11) are formed in each of the two protuberant side support portions (15). At this stage, as best seen in FIG. 4, a thin high-density layer (a thin hardened film) (1A) is created in the whole outer surfaces of padding (1) inclusive of the plural circular recessions (10) and grooves (11).

Thereafter, as shown in FIG. 5(B), a liquid state of adhesive agent (B) is uniformly applied to the whole outer surfaces of padding (1), with a care being taken to insure that it is evenly applied to each of those recessions (10) and grooves (11). In this respect, as understandable from the resulting cured adhesive layer (B) in FIG. 2, it is preferable that the adhesive agent (B) should be applied a greater amount to the two side support portions (15) than to the central support portion (14), with a view to attaining an more increased hardness of the cured adhesive layer in those two particular portions (15) for further intensified supportive and durable effect.

Figure 5C:
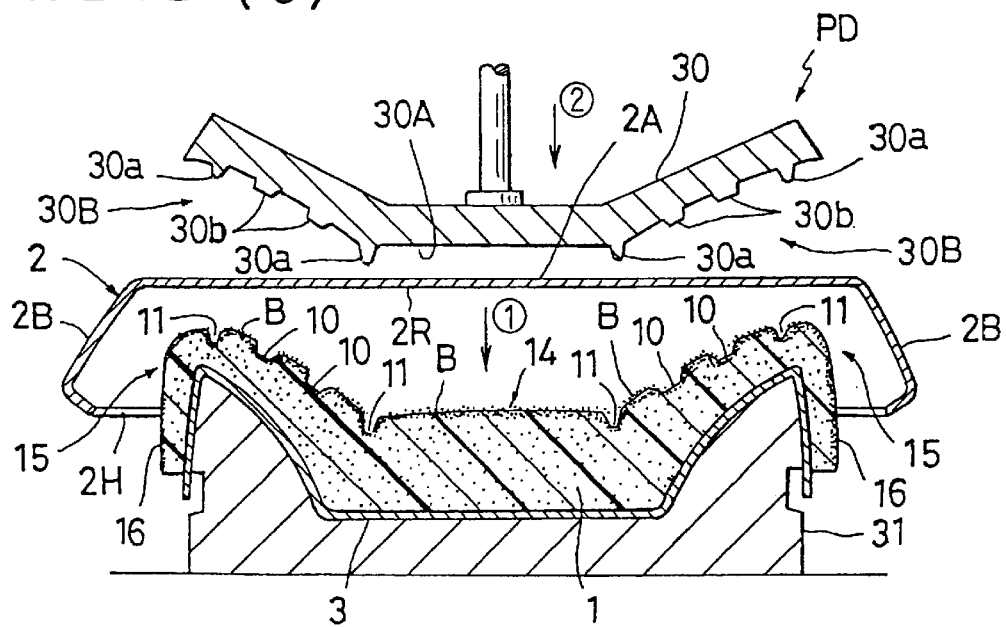
FIG. 5(C) is a schematic cross-sectional view which explanatorily shows a pressing bonding of a trim cover assembly to the foam padding, using a pressure bonding die apparatus.

Following such application of adhesive agent (B), after having been securely provided with a pan-type frame (3) at its bottom surfaces, the seat cushion foam padding (1) is brought to a pressure bonding die apparatus (PD) shown in FIG. 5(C).

The pressure bonding die apparatus (PD) is shown to be composed of a stationary lower die member (31) and an upper pressure die member (30) movable vertically toward and away from the lower die member (31). The upper pressure die member (30) is of such a configuration that generally conforms to the uneven upper surfaces of the foam padding (1) inclusive of the recessions (10) and grooves (11, 13), which have been formed by the above-described steps. Namely, the upper pressure die member (30) is formed with a flat central pressure die surface region (30A) and a pair of spaced-apart lateral pressure die surface regions (30B) (30B) defined symmetric relative to the central pressure die surface region (30A). The central pressure die surface region (30A) is generally equal in area to the central support portion (14) of padding (1). On the other hand, the two lateral pressure die surface regions (30B) are each inclined upwardly as it proceeds from the central die surface region (30A) to the outward side such as to be generally in conformity with the cambered protuberant surface of each of the two side support portions (15) of padding (1). Further, the die surfaces region (30B) has a plurality of generally columnar projections (30b) formed therein, each being equal in dimensions to each of the circular recessions (10) of the padding (1), with such an arrangement that those columnar projections (30b) correspond in number and location to the plural circular recessions (10) for a forcible pressing purpose to be set forth below. The lower die member (31) has the illustrated die surface formed in conformity with the uneven bottom surfaces of padding (1), so that the latter can be placed in position on the former.

Turning back to FIG. 5(C), firstly, the foam padding (1) with the pan-type seat cushion frame (3) attached thereto is securely placed on the lower die member (31). At the present step, a trim cover assembly (2) is provided, which is preformed by sewing together plural separate cover materials in the three-dimensional shape, as shown in FIG. 3, comprising a flat upper cover section (2A) and a peripheral lateral cover section (2B), with an opening (2H) defined at a bottom side opposite to the upper cover section (2A). The whole size of this trim cover assembly (2) is generally equal to that of the foam padding (1) and can therefore be fit attached on the upper surfaces of the latter.

Such trim cover assembly (2) is then attached on the foam padding (1) secured on the lower die member (31), as indicated by the arrow $\hat{1}$ in FIG. 5(C), such that the flat upper cover section (2A) thereof is in the state of being stretched flat above the recessed upper surfaces of padding (1), while the peripheral lateral cover section (2B) embracingly surrounds the corresponding peripheral wall portion (16) of the same padding (1).

Next, in the downward arrow direction $\hat{2}$, the upper pressure die member (30) is lowered to thereby forcibly press and deflect the horizontally stretched upper cover section (2A) of trim cover assembly (2) in the downward direction toward the uneven upper surfaces of foam padding (1), with the result that the whole reverse side (2R) of trim cover assembly (2) is bonded via the adhesive agent (B) to the upper surfaces of foam padding (1). At this moment, all the columnar projections (30a) of pressure die member (30) are brought into total conformity with the circular recessions (10) of padding (1), thus forcibly pressing and inserting the corresponding localized points of upper cover section (2A) into their respective circular recessions (10), while simultaneously, all the elongated annular projections (30a) of the same die member (30) are brought into total conformity with the grooves (11), thereby forcibly pressing and inserting the corresponding localized areas of upper cover section (2A) into their respective grooves (11). While not shown, another projection of pressure die member (30) is inserted into another decorative groove (13) of padding (1), causing forcible insertion of the corresponding local points of trim cover assembly (2) into and along the groove (13) for the pressure bonding. It is thus appreciated that plural stretched points are forcibly formed in the trim cover assembly (2), which effectively results in a highly intensified stretching in both two local areas of trim cover assembly (2) that respectively overlay the two side support portions (15) of padding (1), so that not only an increased support strength, but also an intensified shape retaining effect are achieved over both two side support portions (9) of resulting seat cushion (SC).

In that manner, the upper pressure die member (30) is lowered further toward the lower die member (31), while deeply depressing the foam padding (1) between the two die members, so as to cause a tight, intimate contact between the thus-pressed major area of trim cover assembly (2) and the corresponding uneven surfaces (i.e. 10, 11, 13) of foam padding (1), whereupon the adhesive agent (B) is spread uniformly and sufficiently among the circular recessions (10), grooves (11, 13) and the corresponding pressed areas of trim cover assembly, thereby positively bonding them all together. Hence, there is produced a bonded unit of seat cushion in the dies.

Finally, after having raised the upper pressure die member (30), the resulting seat cushion (SC) is removed from the lower die member (31), and the whole appearance of it is shown in FIG. 1. It is appreciated from FIGS. 1 and 2 that, in the thus-bonded trim cover assembly (2), there are defined a plurality of circular recessions (4) and a plurality of grooves (12, 13), which means that they effectively enlarge the cured, hardened adhesive layer (B) per unit area in each of the two side support portions (9). Thus, a sufficient hardness is given thereto, providing a reinforcing effect enough to prevent both two side support portions (9) against collapsing and sinking during a long period of use. Moreover, as appreciated from FIG. 2 and 6, the cured hard adhesive layer (B) lies in the bottom wall (10B) and peripheral wall (10L) of each of the plural recessions (10) associated with the foam padding (1), whereupon the cured hard adhesive layer (B) is given a generally U-shaped cross-section in each recession (10), including a cylindrical layer wall (B1). Such cylindrically cured adhesive layers (B1) are each in the state where it erects from the padding bottom wall (10B) and the corresponding bottom local area of adhesive layer (10) in a generally perpendicular relation therewith, and therefore, as indicated by the arrows (F) in both FIGS. 2 and 6, the hightwise directions of those cylindrical hardened layers (B1) substantially coincide with the direction in which a load (F) is applied from a thigh side of a driver or passenger. With this arrangement, a highly robust reinforcing structure is provided against the load (F) in the surface of each of the two side support portions (9), hence insuring that each side support portion (9) withstands a repeated exertion of the load (F) thereon over a lengthy period of use.

Figure 6:
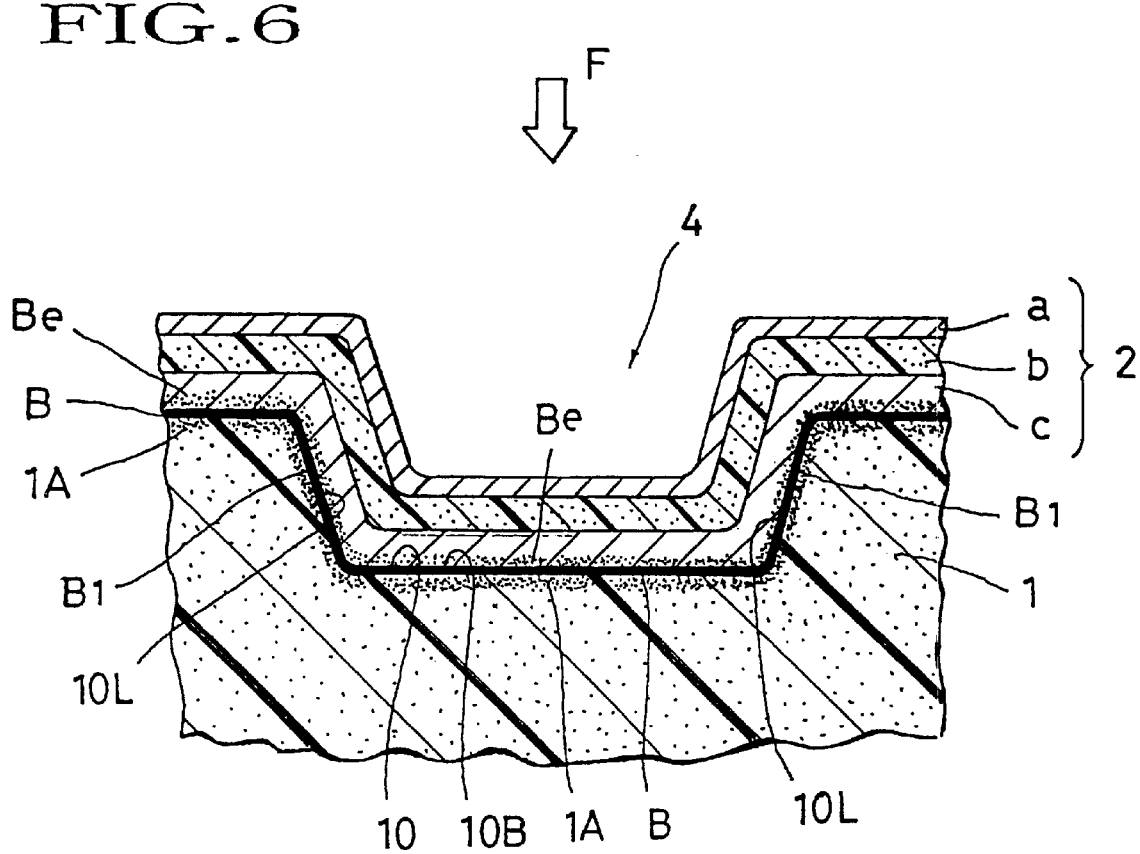
FIG. 6 is a fragmentary sectional view showing a recession formed in the resulting seat or seat cushion the case of the trim cover assembly being of a three-layer lamination structure.
Figure 7:
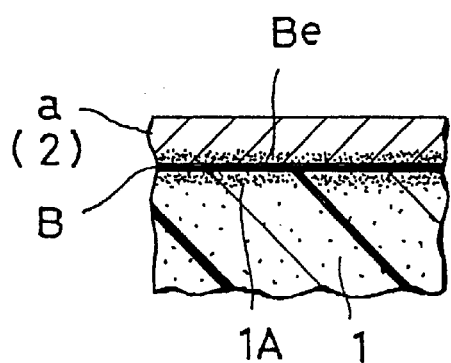
FIG. 7 is a fragmentary sectional view showing the case where the trim cover assembly is of one layer structure.
Figure 8:
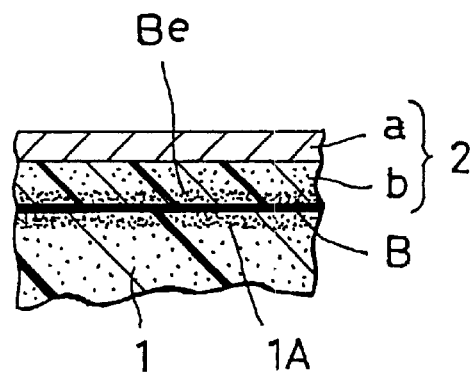
FIG. 8 is a fragmentary sectional view showing the case where the trim cover assembly is of two-layer lamination structure.

Preferably, the trim cover assembly (2) used in the present invention may be of a three-layered lamination structure as shown in FIG. 6, which comprises a top cover layer (a) (made of a textile fabric or knitted material), a foam wadding layer (b) (made of slab urethan foam) and a back cloth layer (c) in this order. In that case, the trim cover assembly (2) itself will become robust in structure, which will add to the above-discussed reinforcing effects against the load (F) as can be appreciated from FIG. 6. But, the trim cover assembly (2) may be of one-layer structure shown in FIG. 7, which only comprises one top cover layer (a), or of two-layered lamination structure as in FIG. 8, which comprises a top cover layer (a) and a foam wadding layer (b), as may be required according to a particular design and conditions. In either cases, as indicated by (Be) in FIGS. 6 to 8, it is observed that a layer directly juxtaposed with foam padding (a), due to its permeable material (such as fabric, foam or cloth material), is generally at its half lower region impregnated with a liquid sate of adhesive agent (B) which is about to be cured during the pressure bonding process described previously with reference to FIGS. 5(B) and 5(C). This creation of adhesive impregnated layer (Be) advantageously expands cured adhesive layer into the trim cover assembly (2) to render more hardened the surfaces of each side support portion (9).

From the descriptions above, it is appreciated in accordance with the present invention that the formation of plural recessions (4) and grooves (5) in the foam padding (a), firstly, enlarges total areas of high-density film layer (1A) on the corresponding surfaces of padding (a) per se, secondly enlarges total areas of cured adhesive layers (B), and thirdly causes a highly stretched state of trim cover assembly (2). Those three effects in the aggregate make increasingly hardened each of the two side support portions (9) of resulting seat cushion (SC) (or seat back). Thus, a supportive property and durability of both two side support portions (9) is greatly improved to maintain their respective shapes over a lengthy period of use, so that a driver or passenger can enjoy a good unchanged supportive touch therebetween. Also, there is no need to prepare two different pieces of foam padding as found in the prior art, and the whole processes for forming the seat are quite simplified. Additionally, such arrangement of circular recessions (4) and decorative grooves (5) presents an aesthetically improved outer appearance of seat on the whole.

While having the present invention thus far, it should be understood that the invention is not limited to the illustrated embodiments, but any other modifications, replacements and additions may be methodologically and structurally applied thereto without departing from the scopes of the appended claims.

What is claimed is:

1. In a vehicle seat having a central seat support region and a pair of spaced-apart protuberant seat side support regions defined symmetric relative to said central seat support region, a reinforced arrangement comprising:
   a foam padding of a predetermined shape conforming to an outer shape of said vehicle seat, which has, formed in the outer surface thereof, a central support portion corresponding to said central seat support region and a pair of spaced-apart protuberant side support portions each respectively corresponding to said pair of spaced-apart protuberant seat side support regions associated with said vehicle seat;
   a plurality of first recessions defined independently of one another in each of said pair of paced-apart protuberant side support portions associated with said foam padding;
   at least one first decorative groove defined in each of said pair of paced-apart protuberant side support portions associated with said foam padding; and
   a trim cover assembly adhesively and pressingly attached via an adhesive agent upon said outer surface of the foam padding,
      wherein said trim cover assembly has, defined therein, a pair of spaced-apart side support cover areas, each covering the respective said pair of spaced-apart protuberant side support portions of said foam padding, wherein, in each of said pair of spaced-apart side support cover areas of the trim cover assembly, there are defined a plurality of second recessions and at least one second decorative groove, and wherein said adhesive agent is cured and hardened between said trim cover assembly and the outer surface of said foam padding, so that a hardened layer of the adhesive agent is created among said plurality of first and second recessions as well as between said at least one first and second decorative grooves.

2. The reinforced arrangement as defined in claim 1, wherein said plurality of first recessions are each of a generally circular shape.

3. The reinforced arrangement as defined in claim 1, wherein said adhesive agent is applied a greater amount to said pair of spaced-apart protuberant side support portions of the foam padding than to said central support portion of the foam padding.

4. The reinforced arrangement as defined in claim 1, wherein said trim cover assembly includes at least one layer juxtaposed via said adhesive agent with the outer surface of said foam padding, said at least one layer being capable of partial impregnation with the adhesive agent.

5. In a vehicle seat having a central seat support region and a pair of spaced-apart protuberant seat side support regions defined symmetric relative to said central seat support region, a reinforced arrangement comprising:
   a foam padding formed by foaming die means into a predetermined shape conforming to an outer configuration of said vehicle seat, such that, in the outer surface thereof, a central support portion is defined in correspondence with said central seat support region, while a pair of spaced-apart protuberant side support portions are each defined in correspondence with the said pair of spaced-apart protuberant seat side support regions, and that a plurality of first recessions and at least one first decorative groove are defined in each of said pair of paced-apart protuberant side support portions, said plurality of first recessions being defined therein independently of one another;
   a trim cover assembly adhesively attached on said outer surface of the foam padding by a pressure bonding die means such that plural local points of the trim cover assembly are forcibly inserted and bonded via an adhesive agent in said plurality of first recessions of said foam padding, respectively, while other at least one local point of the trim cover assembly is forcibly inserted and bonded via the adhesive agent in said at least one first decorative groove;

said trim cover assembly having, defined therein, a pair of spaced-apart side support cover areas, each corresponding to the respective said pair of spaced-apart protuberant side support portions of said foam padding, a plurality of second recessions defined in each of said pair of spaced-apart side support cover areas of the trim cover assembly; and at least one second decorative groove defined in each of said pair of spaced-apart side support cover areas of the trim cover assembly;

wherein said adhesive agent is cured and hardened between said trim cover assembly and the outer surface of said foam padding, so that a hardened layer of the adhesive agent is created between said plurality of first and second recessions and between said at least one first and second decorative grooves.

6. A method of making the vehicle seat in accordance with claim 1, which comprises:

a foaming step for forming said foam padding into said predetermined shape, such that said plurality of first recessions and said at least one first decorative groove are defined in each of said pair of spaced-part protuberant side support portions of the foam padding;

a pressure bonding step for pressingly attaching said trim cover assembly, vie the adhesive agent, upon the outer surface of the thus-formed foam padding, thereby defining said pair of spaced-apart side support cover areas at the respective said pair of spaced-apart protuberant side support portions of the foam padding, in such a manner that plural local points of the trim cover assembly are forcibly inserted and bonded in said plurality of first recessions, respectively, thereby defining said plurality of second recessions in each of said pair of spaced-apart side support cover areas, while at the same time, at least another local point of the trim cover assembly is forcibly inserted and bonded in said at least one first decorative groove, thereby defining said at least one second decorative groove in each of said pair of spaced-apart side support cover areas; and a step for curing the adhesive agent between said trim cover assembly and the outer surface of said foam padding, so that a hardened layer of the adhesive agent is created among said plurality of first and second recessions as well as between said at least one first and second decorative grooves.

7. The method of claim 6, wherein, at said foaming step, a foaming die means is used, which includes a die surface having a plurality of first projections adapted to form said plurality of first recessions and second projections adapted to form said at least one first decorative groove, and wherein, at said pressure bonding step, a pressure bonding die means is used, which include a die element having: a plurality of first projections arranged therein such as to correspond in shape and location to said plurality of second recessions formed in said foam padding; and second projections arranged therein such as to correspond in shape and location to said at least one second decorative groove formed in said foam padding.

8. The method of claim 6, wherein said plurality of first recessions are each of a generally circular shape.

9. The method of claim 6, wherein said adhesive agent is applied a greater amount to said pair of spaced-apart protuberant side support portions of the foam padding than to said central support portion of the foam padding.

10. The method of claim 6, wherein said trim cover assembly includes at least one layer juxtaposed via said adhesive agent with the outer surface of said foam padding, said at least one layer being capable of partial impregnation with the adhesive agent.

* * * * *